(12) United States Patent
Matsumoto et al.

(10) Patent No.: US 6,414,861 B1
(45) Date of Patent: Jul. 2, 2002

(54) DC-DC CONVERTER

(75) Inventors: Tadahiko Matsumoto, Yokohama; Jun Nagai, Sagamihara; Takayoshi Nishiyama, Yokohama; Hitoshi Tsuji, Machida, all of (JP)

(73) Assignee: Murata Manufacturing Co., Ltd. (JP)

( * ) Notice: Subject to any disclaimer, the term of this patent is extended or adjusted under 35 U.S.C. 154(b) by 13 days.

(21) Appl. No.: 09/726,231

(22) Filed: Nov. 29, 2000

(30) Foreign Application Priority Data

Dec. 9, 1999 (JP) .......................................... 11-350075

(51) Int. Cl.[7] ........................ H02H 7/122; H02M 3/335
(52) U.S. Cl. ................... 363/56.1; 363/21.06; 363/127
(58) Field of Search .............................. 363/20, 21.01, 363/21.04, 21.06, 56.01, 56.09, 56.1, 125, 127

(56) References Cited

U.S. PATENT DOCUMENTS

| | | | | |
|---|---|---|---|---|
| 3,582,758 A | * | 6/1971 | Gunn ........................... 363/127 |
| 4,399,499 A | * | 8/1983 | Butcher et al. ................ 363/17 |
| 5,991,171 A | * | 11/1999 | Cheng ....................... 363/21.03 |
| 6,115,276 A | * | 9/2000 | Mao ............................ 363/127 |
| 6,151,233 A | * | 11/2000 | Kondo ......................... 363/125 |
| 6,181,579 B1 | * | 1/2001 | Nagai et al. .............. 363/21.06 |
| 6,243,278 B1 | * | 6/2001 | Jacobs ......................... 363/127 |
| 6,304,461 B1 | * | 10/2001 | Walker ........................ 363/17 |

* cited by examiner

*Primary Examiner*—Adolf Deneke Berhane
(74) *Attorney, Agent, or Firm*—Ostrolenk, Faber, Gerb & Soffen, LLP

(57) ABSTRACT

A DC-DC converter having a switching element and a synchronous rectifier, the switching element undergoing a switching operation, the converter performing a voltage conversion of an input voltage to provide a converted output voltage at an output/input conversion ratio that is determined by the switching operation of said switching element, the converter delivering the converted output voltage to a load, said DC-DC converter further comprising: a reverse current detector for detecting a reverse current which flows from an output of the converter to an input of the converter, and a reverse current suppressor, the reverse current suppressor controlling the switching operation of said switching element so as to increase the output/input conversion ratio when a reverse current is detected by the reverse current detector, thereby suppressing the reverse current.

9 Claims, 7 Drawing Sheets

DC-DC CONVERTER

BACKGROUND OF THE INVENTION

1. Field of the Invention

The present invention relates to a DC-DC converter having a synchronous rectifier and is suitably incorporated in, for example, a switching power supply unit.

2. Description of the Related Art

As well known in the art, a DC-DC converter incorporated in, for example, a switching power supply unit converts a DC input voltage Vin into an alternating current by a switching operation of a switching element (e.g., a MOSFET) and rectifies and smooths the AC voltage by means of a rectifier/smoothing circuit, thereby delivering a D.C. voltage Vout to a load. This type of DC-DC converter permits the output voltage Vout to be variably controlled through a control of the switching operation performed by the switching element. In other words, the ratio of the output voltage Vout to the input voltage Vin (referred to as "output/input ratio") is determined by the switching operation of the switching element. For this reason, it is a common practice to control the switching operation of the switching element so as to stably control the output voltage Vout to a predetermined set voltage. In recent years, the use of a synchronous rectifier as the above-mentioned rectifying/smoothing circuit is becoming popular, in order to reduce a conduction loss.

This known arrangement has a risk that a voltage exceeding the output voltage Vout supplied by the DC-DC converter to the load (referred to as an overshoot voltage) is imposed on the output of the DC-DC converter due to, for example, a drastic rise of the input voltage Vin or a reduction in the current flowing through the load.

Application of such an overshoot voltage causes a smoothing capacitor of the rectifying/smoothing circuit to be charged by charges corresponding to the overshoot voltage. When the output voltage of the DC-DC converter settles again to the steady voltage due to extinction of the overshoot voltage, the smoothing capacitor commences discharging. In the meantime, the switching operation of the switching element has been controlled so as to reduce the output voltage Vout in order to cancel the application of the overshoot voltage, so that the voltage which is the product of the input voltage Vin and the output/input ratio has been lowered to a level below the voltage across the smoothing capacitor. Consequently, the charge discharged from the smoothing capacitor flows in reverse, thus creating a reverse current which flows from the output end to the input end of the DC-DC converter.

Such a reverse current is tremendously large even when the overshoot voltage is so small as to slightly exceed the normal output voltage Vout and, therefore, causes various problems.

The generation of such a large reverse current is attributable to the regulation characteristics as shown in FIG. 7A exhibited by a DC-DC converter having a conventional synchronous rectifier. To be more specific, a DC-DC converter of the type which produces an output voltage Vout through rectification/smoothing performed by a synchronous rectifier has such a regulation characteristic that the incremental variation (gradation) of the output voltage Vout to a decremental variation of the output current is not steep, as will be seen from FIG. 7A. Referring to FIG. 7A, the output current flows from the input end to the output end of the DC-DC converter in the region where the output current is positive (+), whereas the region where the output current is negative (−) is a reverse current region in which the current flows reverse from the output end to the input end of the DC-DC converter.

Due to the regulation characteristic shown in FIG. 7A, even a slight overshoot voltage Vx at the output end of the DC-DC converter causes a large reverse current Ix flowing reverse through the DC-DC converter.

Such a large reverse current causes a large electrical current stress and, hence, poses a risk of breakdown of a component of the DC-DC converter. A DC-DC converter of the type described also has a transformer and a choke coil for rectification and smoothing, in addition to the synchronous rectifier. The reverse current flowing through the on-period of the switching element produces large electromagnetic energy that accumulates in the choke coil and the transformer. Upon turning off of the switching element, the accumulated energy produces a high voltage that is applied to the switching element and the rectifying/smoothing synchronous rectifier, thereby posing a risk of destruction of the switching element and the synchronous rectifier. Thus, the large reverse current involves a problem of breakdown of the components of the DC-DC converter.

A plurality of DC-DC converters may operate in a parallel running manner in which a parallel connection of the DC-DC converters is connected to a load. In such parallel running of DC-DC converters, it is experienced that the DC-DC converters connected in parallel produce different levels of output voltages Vout. Such variation in the output voltage causes a reverse current flowing from a DC-DC converter producing higher level of the output voltage Vout to the DC-DC converter producing a lower level of output voltage Vout.

By way of example, it is assumed here that a DC-DC converter A producing the higher output voltage Vout has a regulation characteristic as shown by a solidline curve "A" in FIG. 7B, whereas a DC-DC converter "B" producing the lower output voltage Vout has a regulation characteristic as shown by a solid-line curve "B" in FIG. 7B. It is also assumed that the plurality of DC-DC converters taking part in the parallel running provide in cooperation a current Ic supplied to the load. In this case, a reverse current Ib, attributable to the higher output voltage Vout produced by the DC-DC converter A is caused to flow in reverse in the DC-DC converter B that produces the lower output voltage Vout, with the result that a loss is caused in the DC-DC converter B due to the reverse current.

Meanwhile, the DC-DC converter A has to supply a current Ia (Ia=Ib+Ic) which is large enough to maintain the current Ic to be supplied to the load, by compensating for the insufficiency caused by the reverse flow of the current Ib. This leads to an increase in the electrical current flowing through the DC-DC converter A and, hence, the loss produced in this DC-DC converter. Thus, a difference in the output voltage Vout between different DC-DC converters that are running in parallel increases losses both in the DC-DC converter A producing the higher output voltage Vout and the DC-DC converter producing the lower output voltage Vout, thus causing a reduction in the efficiency of the circuit.

SUMMARY OF THE INVENTION

The present invention contemplates overcoming these problems. Accordingly, an object of the present invention is to provide a DC-DC converter having a synchronous rectifier which is improved to suppress any reverse current, thereby preventing breakdown of circuit components attributable to the reverse current, and to suppress increase of losses that may be caused by a reverse current occurring during parallel running of a plurality of DC-DC converters.

In order to achieve the above-described object, the present invention overcomes the foregoing problems by the following features. In accordance with the invention, there is provided a DC-DC converter having a synchronous rectifier which, in response to a switching operation of a switching element, performs a voltage conversion of an input voltage at an output/input conversion ratio that is determined by the switching operation of the switching element, and which delivers the converted voltage to a load, the DC-DC converter comprising: a reverse current detector detecting a reverse current which flows from the output to the input, and a reverse current suppressor which, when a reverse current is detected, controls the switching operation of the witching element so as to increase the output/input conversion ratio, thereby suppressing the reverse current.

Further, in accordance with the invention, there is provided a DC-DC converter wherein the switching element is so arranged that its switching operation is controlled based on a control voltage applied to control terminals of the switching element, and wherein the reverse current detector includes a control voltage detector detecting the control voltage of the switching element, inter-terminal voltage detecting means for detecting a voltage across the switching element as measured between a current input terminal and a current output terminal of the switching element, and a reverse current detection signal providing a reverse current detection signal when the control voltage is below a threshold voltage for turning the switching element on while the inter-terminal voltage across the switching element is at a low level as caused by a reverse current.

Further, in accordance with the invention, in the DC-DC converter, the reverse current detector detects the input current or the current flowing through the switching element, and detects that a reverse current is flowing on condition that the detected voltage is not higher than a predetermined set voltage.

Also, in accordance with the invention, the reverse current detector detects a current which flows in a current path and the direction of which is reversed when a reverse current exists, and determines that a reverse current exists based on the direction of the current in the current path.

In the DC-DC converter of the present invention having the features set forth above, when the reverse current detector has detected a reverse current, the reverse current suppressor controls the switching operation of the switching element so as to increase the output/input conversion ratio. This control performed by the reverse current suppressor provides the DC-DC converter of the present invention with a regulation characteristic which shows a steep incremental gradient of the output voltage with respect to an incremental variation of a reverse current. Therefore, when an overshoot voltage is imposed on the output end of the DC-DC converter, the reverse current attributable to the overshoot voltage is remarkably suppressed as compared with that experienced in the conventional arrangement.

This serves to substantially completely eliminate breakdown of parts attributable to a reverse current. In addition, when there is a variation in the output voltage among a plurality of DC-DC converters running in parallel, any reverse current attributable to such an output voltage variation is suppressed to reduce any loss incurred in the DC-DC voltage flowing through the DC-DC converter, thus suppressing reduction in the efficiency of the circuit.

In accordance with the present invention, the DC-DC converter has a reverse current detector and a reverse current suppressor which, when a reverse current is detected, operate to control the operation of a switching element in such a direction as to increase the output/input conversion ratio. This arrangement imparts to the DC-DC converter a peculiar characteristic which serves to suppress a reverse current when such a reverse current exists.

With the features set forth above, it is possible to provide a DC-DC converter having a synchronous rectifier which implements a revolutionary unique feature of suppressing reverse current caused by any overshoot voltage appearing at the output side of the DC-DC converter that has never been achieved heretofore.

As will be understood from the foregoing description, the DC-DC converter of the present invention can suppress any reverse current, thus eliminating almost completely various problems such as breakdown of circuit components which otherwise would be caused by a large reverse current, thus enhancing the reliability of the DC-DC converter over a long period of use.

When a plurality of DC-DC converters are used in a parallel-running fashion, a reverse current which may be caused by a variation in the output voltage among these DC-DC converters is suppressed by the aforesaid peculiar characteristic offered by the invention, thus avoiding increase in the loss which otherwise may be caused by a reverse current, thus preventing reduction in the efficiency of the entire circuit.

The reverse current suppressor may comprise a control voltage detector an inter-terminal voltage detector and a reverse current detection signal output device. The reverse current detector may be arranged to detect an input current or a current flowing through the switching element and to determine that a reverse current exists when the detected current is not greater than a predetermined set value. The reverse current detector also may be implemented by an element capable of detecting a current in a path of a current which reverses its direction when a reverse current exists, so that occurrence of a reverse current is determined based on the direction of the current detected in this path. All these forms of the invention enable detection of a reverse current by simple circuit arrangements, while achieving advantageous effects equivalent to those discussed above.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWING(S)

Figure 1:
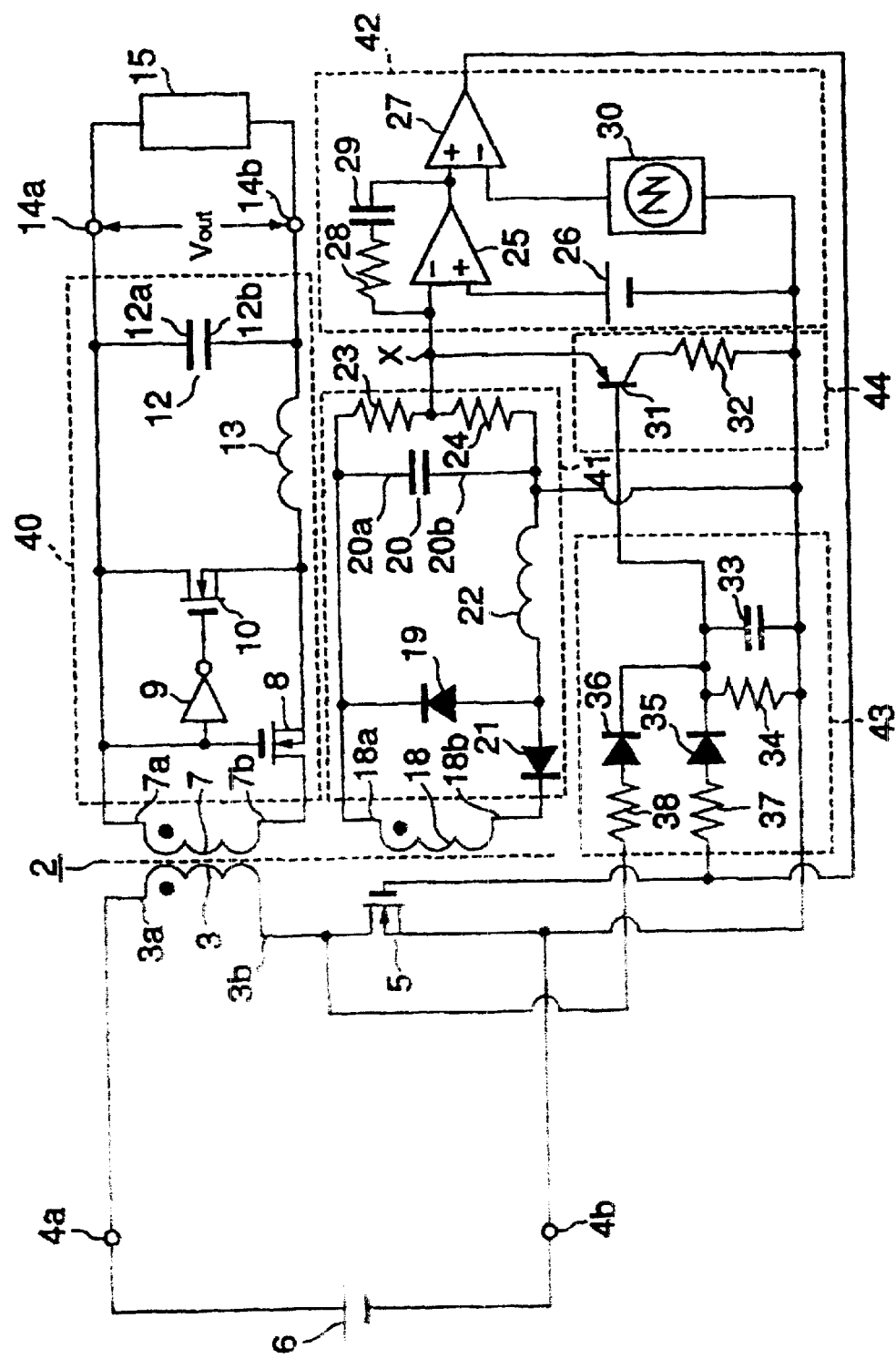
FIG. 1 is a block diagram of a circuit implementing a first embodiment or the invention.
Figure 3:
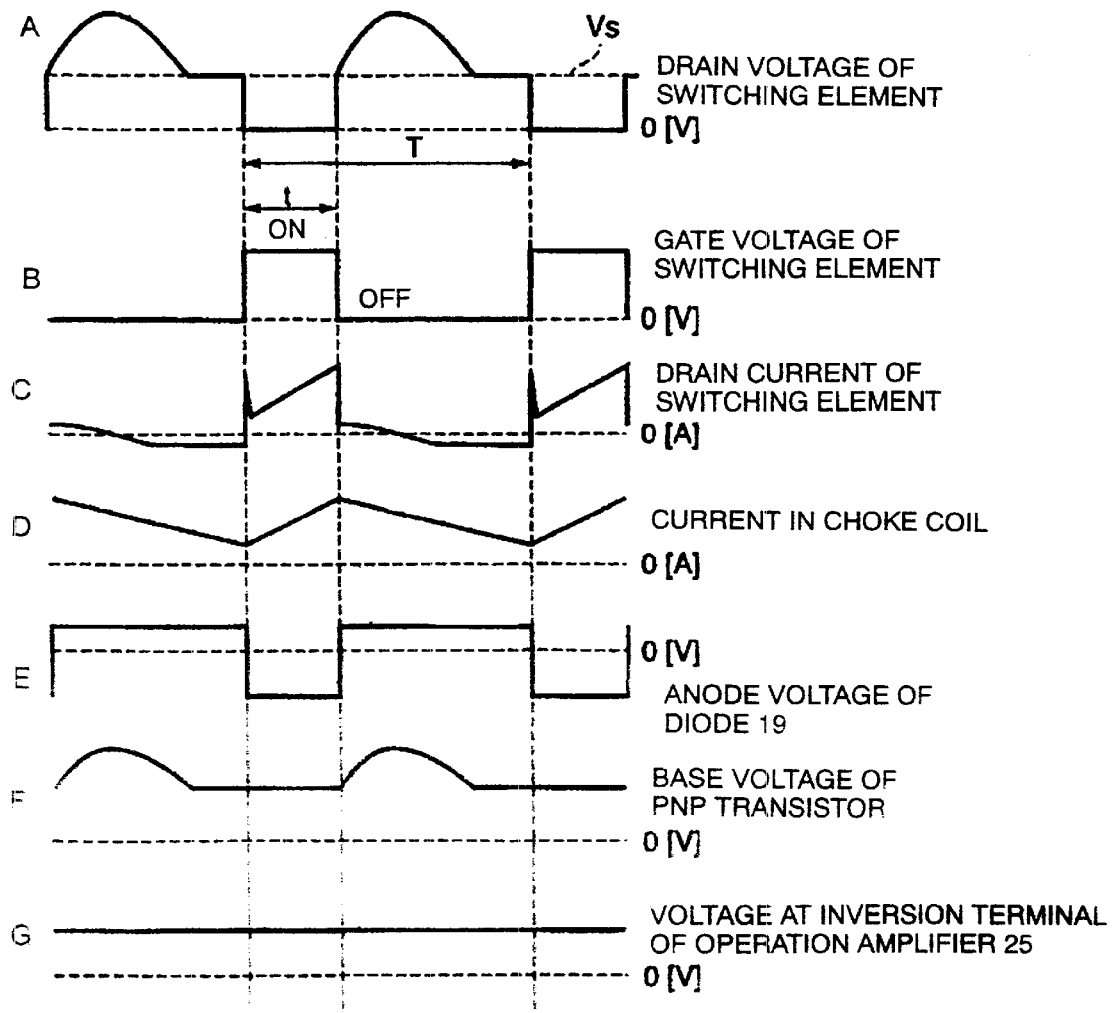

FIG. 3 a waveform chart showing a voltage or a current applied to or flowing through major circuit components of the DC-DC converter of FIG. 1 when there is no reverse current.

Figure 4:
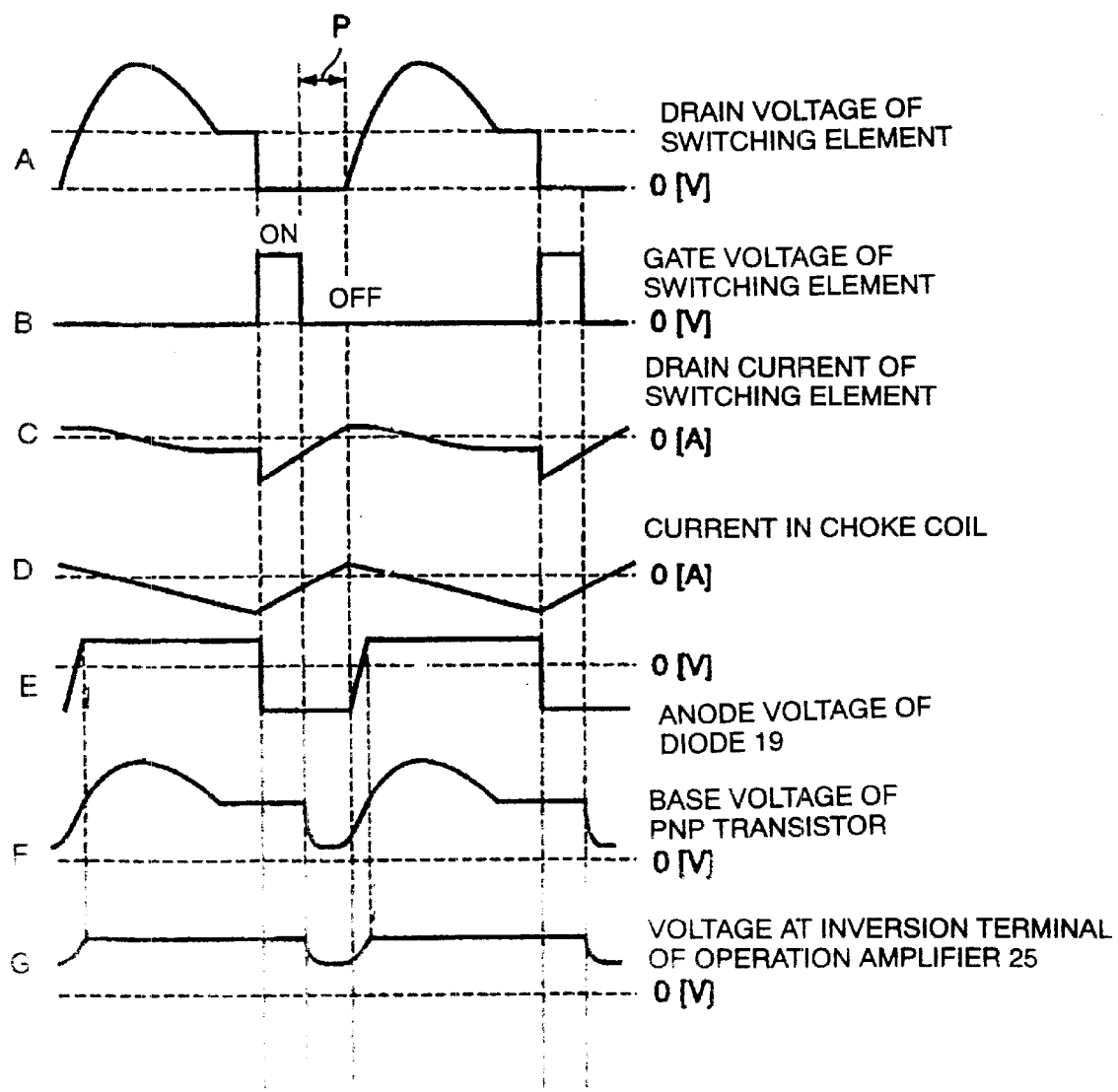

FIG. 4 is a waveform chart showing a voltage or a current applied to or flowing through major circuit components of the DC-DC converter of FIG. 1 when there is a reverse current.

Figure 5:
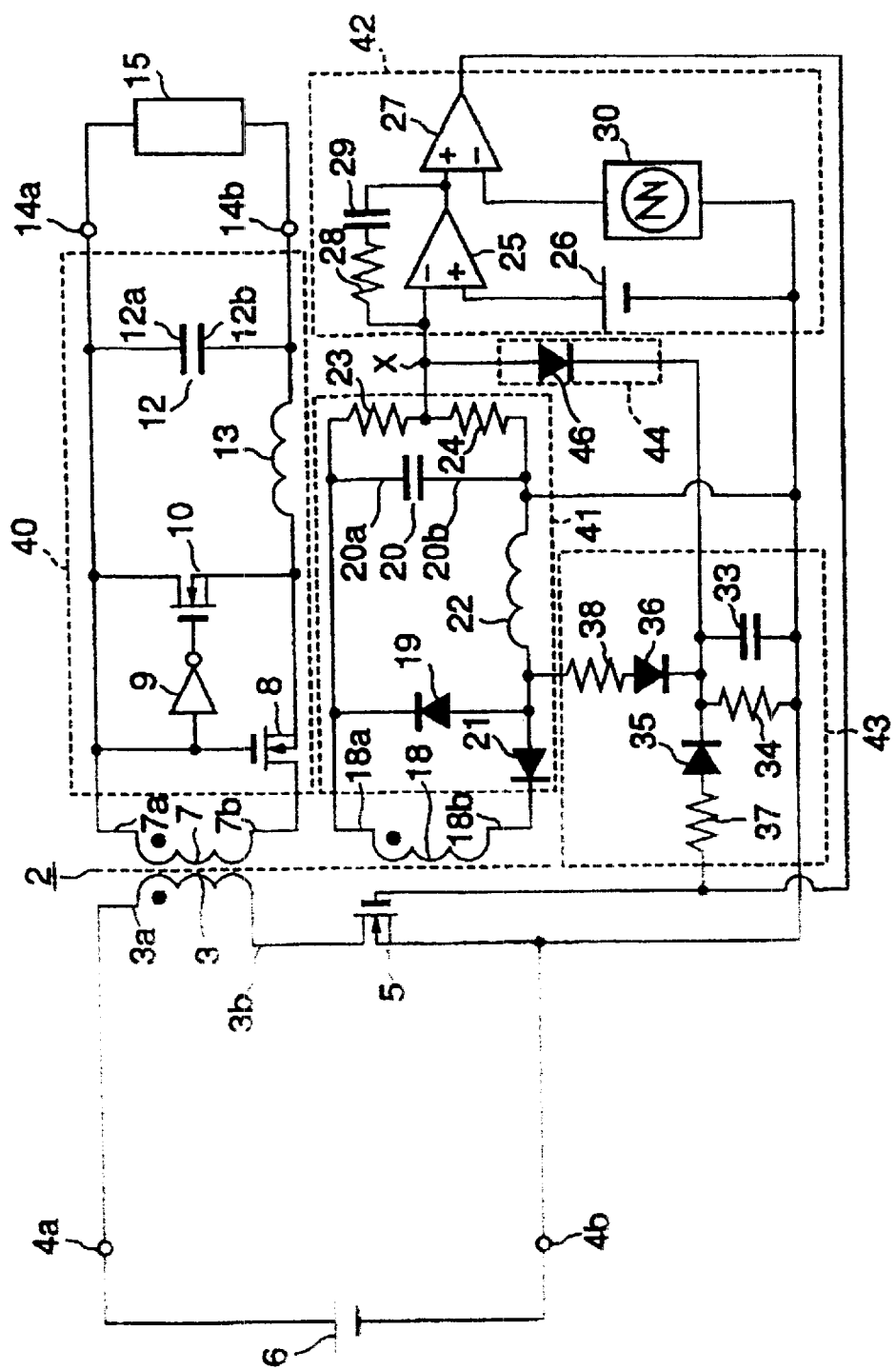

FIG. 5 is a block diagram showing a circuit implementing a second embodiment of the invention.

Figure 6:
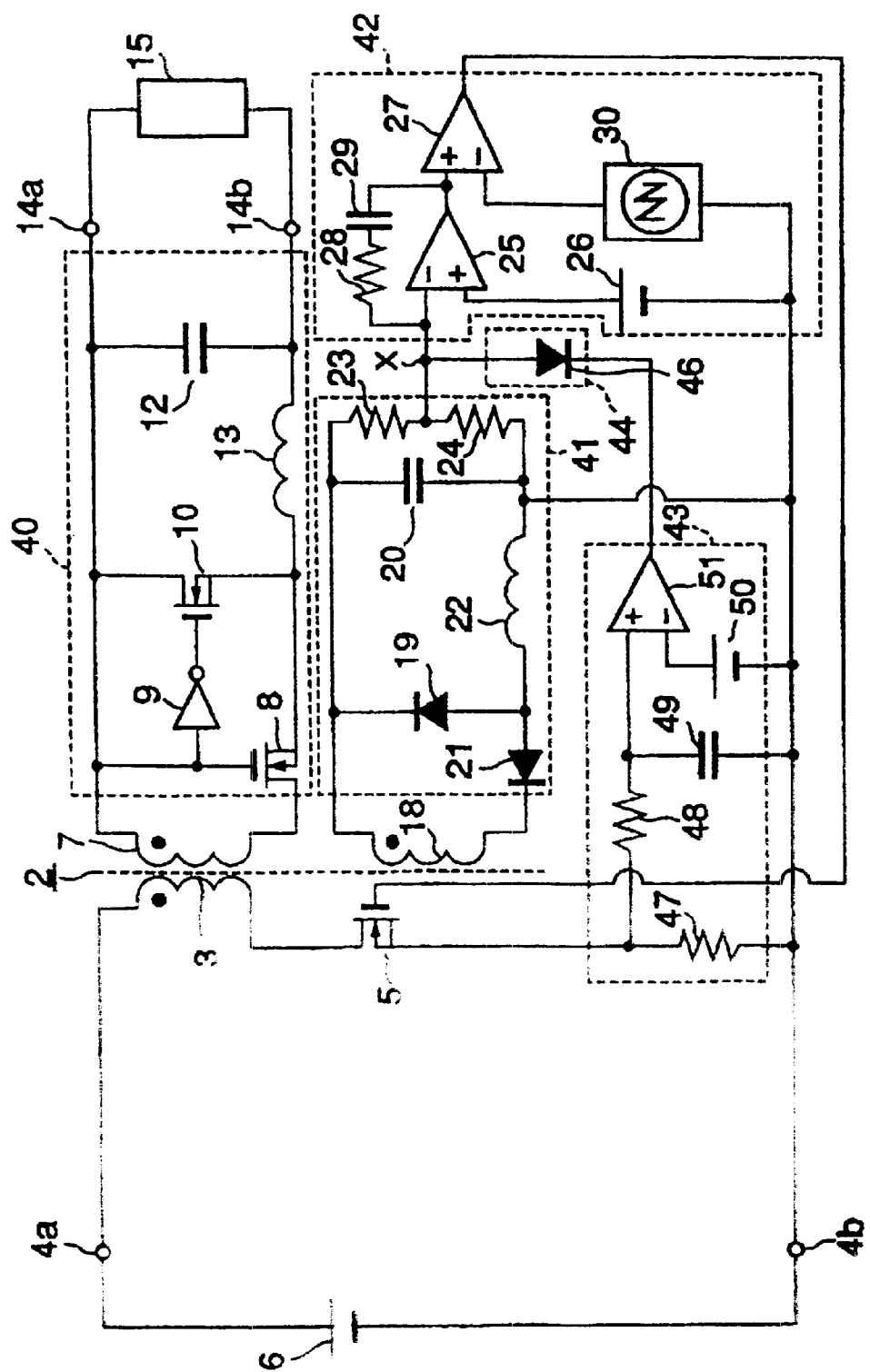

FIG. 6 is a block diagram sowing a circuit implementing a third embodiment of the invention.

Figure 7A:
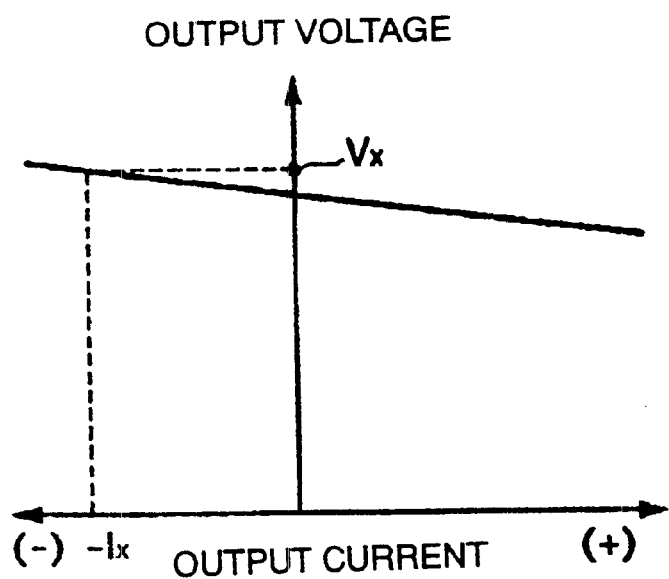
Figure 7B:
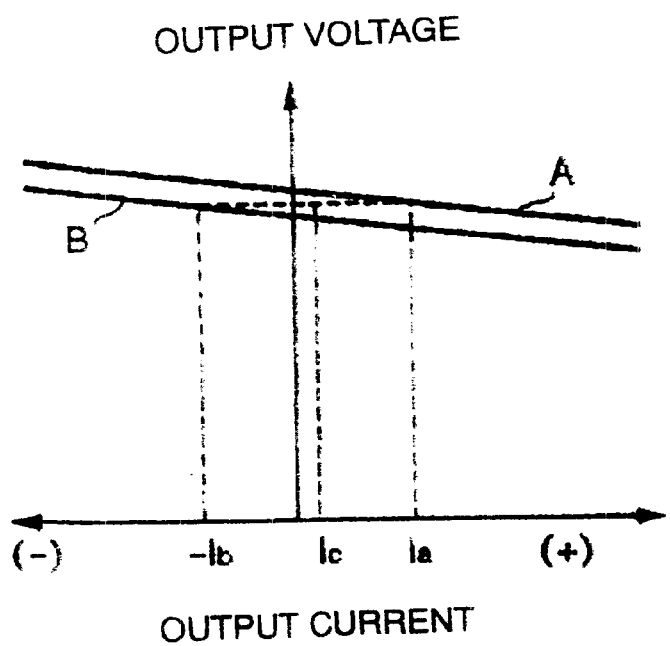

FIGS. 7A and 7B are graphs showing a regulation characteristic exhibited by a DC-DC converter incorporating a conventional synchronous rectifier.

DETAILED DESCRIPTION OF EMBODIMENTS OF THE INVENTION

Hereinafter, the preferred embodiments of the present invention are explained in detail with reference to the drawings.

Figure 2A:
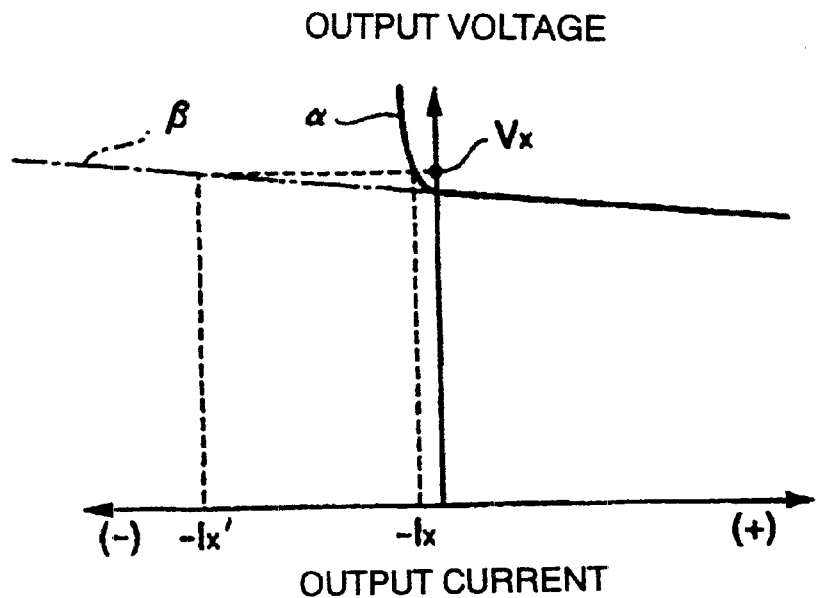
FIGS. 2A and 2B are graphs showing a regulation characteristic according to the present invention.

In order to suppress any reverse current, the present inventors have conceived a DC-DC converter circuit which has a regulation characteristic as shown by a full-line curve "α" in FIG. 2A: namely, a regulation characteristic α that causes a steep gradient of incremental variation of the output voltage Vout to an incremental variation in a reverse current in a reverse current conduction region where the output current is negative (−).

The regulation characteristic α DC-DC converter when an overshoot voltage Vx is applied to the output of the DC-DC converter. In contrast, a conventional regulation characteristic β causes a reverse current Ix' much greater than Ix to flow through the DC-DC converter when the same overshoot voltage Vx is applied to the output of the DC-DC converter.

The regulation characteristic α permits a remarkable suppression of the reverse current in the DC-DC converter over the known arrangement, thus eliminating problems which otherwise may occur due to reverse flow of a large current.

In order to implement the regulation characteristic α of the DC-DC converter, the present inventors have conceived to incorporate, in a DC-DC converter, a reverse current detector for detecting any reverse current, and a reverse current suppressor which, when a reverse current is detected, controls the switching operation of the switching element so as to increase the output/input conversion ratio, thereby suppressing the reverse current.

Various types of circuits are conceivable to implement the above-described reverse current detector and the reverse current suppressor, practical examples of which are shown below.

FIG. 1 shows a first embodiment of the DC-DC converter having a synchronous rectifier and incorporating the above-described reverse current detector and the reverse current suppressor which in cooperation implement the regulation characteristic α. More specifically, the DC-DC converter 1 shown in FIG. 1 is an insulated forward converter having a transformer 2. The transformer 2 has a primary coil 3 which has one end 3a connected to an input node 4a and the other end 3b connected to the drain of a switching element 5 which comprises, for example, a MOS-FET. The switching element 5 has a source that is connected to an input node 4b. The input nodes 4a and 4b are connected to the positive terminal and the negative terminal of an input power supply unit 6, whereby the primary side of the transformer 2 is connected to the input power supply unit 6.

To one end 7a of a secondary coil 7 of the transformer 2 are connected a gate of a rectifier-side synchronous rectifier 8 comprising, for example, a MOS-FET, an input end of an inverter 9, a drain of an inverter-side synchronous rectifier 10, and one end 12a of a smoothing capacitor 12.

To the other terminal 7b of the secondary coil 7, connected is the drain of the above-mentioned rectifier-side synchronous rectifier 8 the source of which is connected to the source of the above-mentioned inverter-side synchronous rectifier 10 whose gate is connected to the output of the inverter 9. A choke coil 13 has one end connected to the node between the sources of the rectifier-side synchronous rectifier 8 and the inverter-side synchronous inverter 10, while the other end of the choke coil 13 is connected to the other end 12b of the above-mentioned smoothing capacitor 12.

A load 15 is connected in parallel with the smoothing capacitor 12, at the nodes 14a and 14b.

The transformer 2 has a ternary coil 18 having one end 18a to which are connected a cathode of a diode 19 and one end 20a of a capacitor 20. The other end 18b of the ternary coil 18 is connected to the cathode of a diode 21. The anode of the above-mentioned diode 19 and one end of a choke coil 22 are connected to the anode of the diode 21. The other end 20b of the above-mentioned capacitor 20 is connected to the other end of the choke coil 22. A series connection of resistors 23 and 24 is connected in parallel with the capacitor 20.

An inverting input terminal (−) of an operational amplifier 25 is connected to the node between the resistors 23 and 24. The operational amplifier 25 has the noninverting input terminal (+) connected to a positive terminal of a reference power supply unit 26. The output of the operational amplifier 25 is connected to a noninverting input terminal (+) of a comparator 27. The inverting input terminal and the output of the operational amplifier 25 are connected through a phase compensating series connection of a resistor 28 and a capacitor 29.

A triangular wave oscillator 30 is connected at its output to the inverting terminal (−) if the above-mentioned comparator 27. The output of the comparator 27 is connected to the gate of the aforementioned switching element 5.

The emitter of a PNP transistor 31 is connected to the juncture X where the node between the resistors 23 and 24 is connected to the inverting input terminal of the operational amplifier 25. To the collector of the PNP transistor 31 is connected one end of a resistor 32, the other end of which is connected to ground.

To the base of the PNP transistor 31 are connected one end of a capacitor 33, one end of a resistor 34, the cathode of a diode 35 and the cathode of a diode 36. The other end of the capacitor 33 and the other end of the resistor 34 are grounded.

The anode of the diode 35 is connected to one end of a resistor 37, the other end of which is connected to the gate of the switching element 5. To the anode of the above-mentioned diode 36 is connected one end of a resistor 38, the other end of which is grounded to the drain of the above-mentioned switching element 5.

The rectifier-side synchronous rectifier 8, the inverter 9, the inverter-side synchronous rectifier 10, the smoothing capacitor 12 and the choke coil 13 in cooperation provide a rectifying/smoothing circuit 40. The rectifying/smoothing circuit 40 serves to rectify and smooth an AC voltage derived from the secondary coil 7 of the transformer 2 and to supply a resultant DC voltage Vout to the load 15.

The diodes 21, 19, the capacitor 20 and the choke coil 22 in cooperation provide an output voltage detecting circuit 41 which detects the above-mentioned output voltage Vout. The energy output from the ternary coil 18 corresponds to the output voltage Vout which is supplied from the DC-DC converter to the load 15. Based on this fact, the output voltage detecting circuit 41 rectifies and smooths the AC voltage output from the ternary coil 18 and divides the resultant voltage by means of the resistors 23 and 24, thus producing a detection voltage indicative of the output voltage Vout.

The above-mentioned operational amplifier 25, the reference power supply unit 26, the comparator 27, the resistor 28, the capacitor 29 and the triangular wave oscillator 30 constitute a control circuit 42. The control circuit 42 controls the switching operation of the switching element 5 so as to stabilize the output voltage Vout to a set voltage, based on the detection voltage output from the output voltage detection circuit 41 and indicative of the output voltage Vout. In the first embodiment which is now being described, the control circuit 42 operates such that a pulse waveform signal B as shown in FIG. 3, serving as a control voltage, is supplied from the output of the comparator 27 to a control terminal which is the gate of the switching element 5. The duration or width "t" of the pulse waveform signal is variably controlled in such a direction as to stabilize the output voltage Vout, thereby variably controlling the on-period of the switching element 5. In other words, the control circuit 42 serves to variably control the duty ratio (ratio of the on-period "t" to one period T composed of on- and off-periods) of the switching element 5. This variably controls the output voltage Vout to stabilize the same.

The reverse current detector which is one of the features of the first embodiment is constituted by the above-mentioned capacitor 33, resistors 34, 37 and 38, and the diodes 35 and 36, while the reverse current suppressor is constituted by the above-mentioned PNP transistor 31 and the resistor 32. The reverse current detector is identified by block 43 and the reverse current suppressor is identified by block 44.

FIG. 3 shows, by way of example, the waveforms of a current or a voltage that appears in the major circuit components of the DC-DC converter when there is no reverse current. FIG. 4 shows, by way of example, the waveforms of a current or a voltage that appears in the major circuit components of the DC-DC converter when there is a reverse current. When there is no reverse current, at the moment at which the switching element 5 is turned off due to the gate voltage of the switching element 5 having come down below a predetermined threshold voltage for driving the switching element 5, the drain voltage of the switching element 5 (voltage between drain and source, i.e., the inter-terminal voltage across the switching element between both terminals through which the current flows into and out of the switching element) drastically rises from zero to a level not lower than a voltage Vs which is determined based on the input voltage Vin imposed by the input power supply unit 6, as will be seen from waveforms A and B in FIG. 3.

In contrast, when there is a reverse current, there is a period P over which the drain voltage of the switching element 5 remains unchanged (i.e., kept at zero volt in the first embodiment) due to the presence of the reverse current, despite the turning off of the switching element 5, as will be seen from waveforms A and B in FIG. 4. This phenomenon is attributable to the fact that the energy that has been stored in the choke coil 13 of the rectifying/smoothing circuit 40 due to the occurrence of the reverse current is released as a result of the turning off of the switching element 5 and transmitted from the secondary side to the primary side of the transformer 2. Thus, the phenomenon is peculiar to the state in which a reverse current exists.

Noting the above-mentioned phenomenon peculiar to a reverse current, the inventors have conceived the reverse current detector 43 which determines that a reverse current exists on conditions that the gate voltage of the switching element 5 is below a threshold voltage for driving the switching element and that the drain voltage (inter-terminal voltage) of the switching element is kept at a low level due to a reverse current (i.e., when the drain voltage is zero in this embodiment).

Thus, the reverse current detector 43 has the following components: a gate voltage detector constituted by the diode 35 and the resistor 37 and serving as a control voltage detector; a drain-source voltage detector (drain voltage detector) constituted by the diode 36 and the resistor 38 and serving as the inter-terminal voltage detector; and a reverse current detection signal outputting device constituted by the capacitor 33 and the resistor 34 and serving to output a reverse current detecting signal on conditions that the gate voltage of the switching element 5 is below a predetermined threshold voltage for driving the switching element and that the drain voltage (inter-terminal voltage) of the switching element is low.

The first embodiment of the DC-DC converter in accordance with the present invention has the features as described heretofore. A brief description will now be given of the operations of the above-described reverse current detector and the reverse current suppressor of the first embodiment.

In the reverse current detector 43, the diode 35 and the resistor 37 in cooperation detect the gate voltage of the switching element 5, while the diode 36 and the resistor 38 in cooperation detect the drain voltage (drain-source voltage) of the switching element 5. The gate voltage and the drain voltage thus detected are supplied to the capacitor 33 and to the resistor 34, respectively. The capacitor 33 and the resistor 34 serve to produce a voltage as shown by waveform F in FIG. 3 or in FIG. 4 corresponding to the voltages applied thereto, and supplies this voltage to the base of a PNP transistor 31 of the reverse current suppressor 44.

When the conditions that the above-mentioned gate voltage is below the predetermined threshold voltage for driving the switching element and the drain voltage of the switching element 5 is low due to presence of a reverse current are met, the level of the voltage supplied to the base of the PNP transistor 31 from the capacitor 33 and the resistor 34 is lower than that obtained when one or both of these conditions are not met, as will be seen from waveform F in FIG. 4. In this first embodiment, the circuit constants are determined such that the base voltage of the PNP transistor 31 that has been lowered provides a signal having the predetermined driving voltage level. To be more specific, the arrangement is such that, when a reverse current exists, the capacitor 33 and the resistor 34 serve to supply the base of the PNP transistor 31 with a reverse current detection signal of a level high enough to turn on and drive the PNP transistor 31.

The above-mentioned PNP transistor 31 is turned on by the above-mentioned reverse current detection signal. This allows part of the electric current flowing from the node between the resistors 23 and 24 towards the non-inverting terminal of the operational amplifier 25 to shunt from the aforesaid juncture X so as to flow through the PNP transistor 31 and the resistor 32. As a consequence, when a reverse current exists, the voltage supplied to the non-inverting input terminal of the operational amplifier 25 is reduced to a level lower than usual, despite the fact that the voltage derived from the node between the resistors 23 and 24 is higher than usual due to the presence of the aforesaid overshoot voltage. This reduction in the voltage causes the pulse width "t" of the pulse waveform signal supplied by the control circuit 42 to the gate of the switching element 5 to be increased, whereby the on-period of the switching element is prolonged to change the output/input conversion ratio, thereby increasing the output voltage Vout.

The first embodiment as described has the reverse current detector 43 and the reverse current suppressor 44 which serve to increase the output/input conversion ratio when a reverse current exists, thus imparting to the DC-DC converter a regulation characteristic "a" as shown by the solid-line curve "α" in FIG. 2A, thereby making it possible to remarkably reduce any reverse current.

It is therefore possible to suppress reverse current and, hence, to avoid problems such as breakdown of the circuit components attributable to occurrence of a large reverse current.

When a plurality of DC-DC converters of the first embodiment are used in a parallel-running fashion, the tendency for the loss to increase due to a reverse current is suppressed despite any variation of the output voltage Vout among the plurality of DC-DC converters, thus preventing reduction in the efficiency of the entire circuit.

Figure 2B:
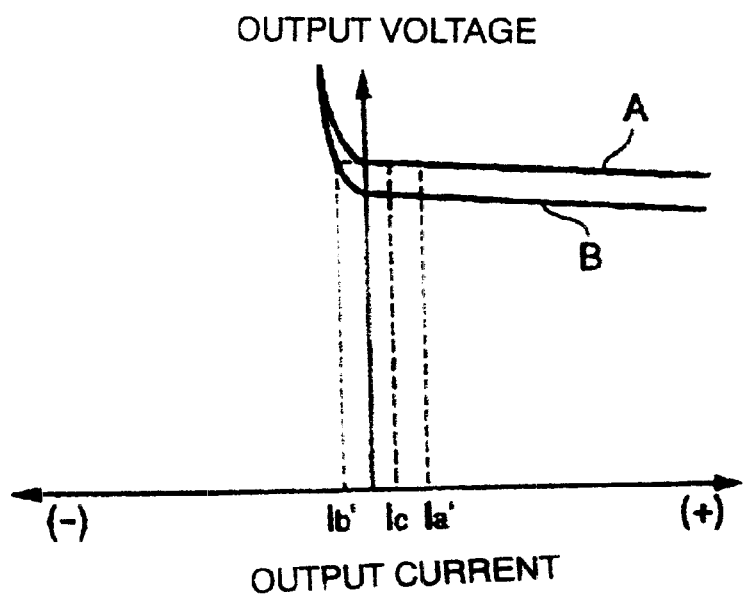

More specifically, the DC-DC converter A producing a higher output voltage Vout, among the plural DC-DC converters, exhibits a regulation characteristic as shown, for example, by the solid-line curve A of FIG. 2B, while the DC-DC converter B producing a lower output voltage Vout exhibits a regulation characteristic as shown, for example, by the solid-line curve B in FIG. 2B. Consequently, the reverse current Ib' which flows from the DC-DC converter A back into the DC-DC converter B is much smaller than the reverse current Ib shown in FIG. 7B which would appear under the conventional regulation characteristics. It is thus possible to reduce and suppress the loss occurring in the DC-DC converter B attributable to the reverse current.

At the same time, the electrical current flowing through the DC-DC converter A also is reduced by virtue of the decrease in the reverse current flowing back into the DC-DC converter B, whereby a reduction in the loss is achievable also in the DC-DC converter A.

The suppression of the reverse current also effects a remarkable reduction in the loss attributable to any reverse current occurring during parallel-running, thus preventing reduction in the efficiency of the entire circuit.

A description will now be given of a second embodiment.

As shown in FIG. 5, in the second embodiment one end of resistor 38 of the reverse current detector 43 is connected to the node between the anodes of the diodes 19 and 21 of the output voltage detecting circuit 41, unlike the first embodiment in which the above-mentioned one end of the resistor 38 is connected to the drain of the switching element 5.

Another feature of the second embodiment is that the reverse current suppressor 44 employs a diode 46 in place of the PNP transistor 31 and the resistor 32 that are used in the first embodiment. The diode 46 has an anode which is connected to the juncture X between the inverting input terminal of the operational amplifier 25 and the node between the resistors 23 and 24, and a cathode connected to the output of the reverse current detector 44 (the capacitor 33 and the resistor 34).

Other portions of the second embodiment are the same as those of the first embodiment. In the following description of the second embodiment, therefore, the same reference numerals as those used in the description of the first embodiment are used to denote parts or components that are the same as those in the first embodiment, and detailed description of such parts or components are omitted to avoid duplication of description.

As shown by waveforms A and B in FIG. 3 and waveforms A and B in FIG. 4, the voltage on the anodes of the diodes 19 and 21 is negative when the drain voltage of the switching element 5 is kept low due to presence of a reverse current, otherwise the anode voltage is positive. Noting this phenomenon, the second embodiment indirectly detects the low-voltage state of the drain voltage (inter-terminal voltage) of the switching element, through sensing the anode voltage of the diodes 19 and 21 by means of the diode 36 and the resistor 38, in contrast to the first embodiment which directly detects the low-voltage state of the drain voltage (inter-terminal voltage) of the switching element 5.

The reverse current detector 43 in the second embodiment is arranged such that, when a reverse current exists so that the gate voltage of the switching element 5 is below the threshold voltage for driving the switching element 5 and the drain voltage of the switching element 5 is low (i.e., the voltage at the node between the diode 19 and the diode 21 is negative), the reverse voltage detector 43 operates to lower the voltage at the cathode of the diode 46, thereby establishing a voltage higher than the voltage for turning on and driving the diode 46.

Therefore, when a reverse current exists, the diode 46 is turned on, so that part of the current flowing from the node between the resistors 23 and 24 towards the operational amplifier 25 is allowed to shunt at the aforesaid juncture X so as to flow through the diode 46, whereby the voltage applied to the inverting input terminal of the operational amplifier 25 is lowered, as in the case of the first embodiment. As a consequence, the pulse width "t" of the pulse waveform signal supplied by the control circuit 42 to the switching element 5 is increased, with the result that the output/input conversion ratio also is increased to raise the output voltage Vout.

As is the case of the first embodiment, the second embodiment is configured to include the reverse current detector 43 and the reverse current suppressor 44 such that the output/input conversion ratio is increased when a reverse flow exists. Thus, a DC-DC converter is enabled to exhibit a regulation characteristic α as shown in FIG. 2A. It is therefore possible to suppress any reverse current, thereby obviating various problems attributable to such a reverse current.

A description will now be given of a third embodiment. In the following description of the third embodiment, parts or components which are the same as those in the preceding embodiments are denoted by the same reference numerals as those used in the foregoing description, and detailed description of such parts or components is omitted to avoid duplication of description.

As shown in FIG. 6, the reverse current detector 43 is constituted by resistors 47, 48, a capacitor 49, a reference power supply unit 50 and an operational amplifier 51, while the reverse current suppressor 44 comprises a diode 46. Other portions are the same as those of the preceding embodiments.

To be more specific, the resistor 47 is connected to the source of the switching element 5 in series thereto, while the resistor 48 is connected at its one end to the node between the resistor 47 and the source of the switching element 5. The other end of the resistor 48 is connected to one end of the capacitor 49 and also to a non-inverting input terminal (+) of the operational amplifier 51. The reference voltage power supply unit 50 has a positive terminal which is connected to the inverting input terminal (−) of the operational amplifier 51. The other end of the capacitor 49 and the negative electrode of the reference power supply unit 50 are connected to ground. To the output of the operational amplifier 51 is connected the cathode of the diode 46 whose anode is connected to the aforesaid juncture X as in the case of the second embodiment.

The DC-DC converter of the third embodiment, having the construction as described above, features the operations of the reverse current detector 43 and the reverse current suppressor 44 as exemplarily described in the following.

For instance, the resistor 47 detects a drain current supplied to the switching element 5 and delivers an output to an integrating circuit which is constituted by the resistor 48 and the capacitor 49. The integrating circuit integrates the drain current and supplies the resultant output to the non-inverting input terminal of the operational amplifier 51. In the presence of a reverse current, the drain current supplied to the switching element 5, shown by waveform C in FIG. 4, is much smaller than the drain current supplied to the switching element 5 in the absence of a reverse current, shown by waveform in FIG. 3. When a reverse current exists, therefore, the voltage supplied by the integrating circuit to the non-inverting input terminal of the operational amplifier 51 is much smaller than that supplied when there is no reverse current.

The third embodiment makes use of the fact that the voltage supplied to the non-inverting input terminal of the operational amplifier 51 is low when a reverse current exists. More specifically, the voltage at the output of the operational amplifier 51 is lowered when a reverse current exists, so that the diode 46 is turned on as in the case of the second embodiment. Thus, when the reverse current exists, the operational amplifier 51 operates to as to turn the diode 46 on, whereby part of the current flowing from the node between the resistors 23 and 24 towards the operational amplifier 25 is caused to shunt to the diode 46 at the juncture X, whereby the output voltage Vout is raised, as in the cases of the preceding embodiments.

In the third embodiment as described, the output/input conversion ratio is increased when a reverse current exists, thus realizing the aforesaid peculiar regulation characteristic α. It is therefore possible to suppress any reverse current so as to avoid various problems which otherwise may be caused by a large reverse current.

When a difference or variation of the output voltage Vout appears among a plurality of DC-DC converters that are running in parallel, it is possible to suppress a reverse current which is caused by such a variation in the output voltage Vout. This serves to reduce the loss attributable to the presence of the reverse current, contributing to reduction in the efficiency of the entire circuit.

The embodiments described heretofore are not exclusive and various changes may be imparted thereto. For instance, the reverse current detector 43 used in the described embodiments may be substituted by a reverse current detector having the following configuration. For instance, the reverse current detector may employ a current detecting element provided in a portion of the circuit which is on the output side of the smoothing capacitor 12, so that the reverse current detecting means determines that a reverse current exists when the current detecting element has detected a current which flows from the load 15 towards the smoothing capacitor 12.

It is also possible to implement the reverse current detecting means by a current detecting element which is provided on a current path leading from the input power supply unit 6 towards the primary coil 3, so that any reverse current is sensed based on the direction of the electrical current detected by the current detecting element.

In the third embodiment as described, the drain current of the switching element 5 is detected by using the resistor 47. The resistor 47, however, may be substituted by a current transformer which detects the drain current of the switching element 5. The third embodiment as described is configured to determine that a reverse current exists, on condition that the integrated value of the drain current detected on the switching element is below a set value. This, however, is substituted by another arrangement such as, for example, an arrangement which detects the drain current on the switching element 5 and determines that a reverse current exists when the drain current in the on-period of the switching element 5 is not greater than a set value. It is thus possible to detect a reverse current, without relying upon integration of current values. In the third embodiment as described, the detection of a reverse current relies upon the detection of the drain current on the switching element. This, however, is also illustrative and the arrangement may be such that the input current supplied from the input power supply unit 6 is detected, and it is determined that a reverse current exists when the detected input current or an integrated value of the same does not exceed a predetermined set value.

The DC-DC converter of each of the embodiments described heretofore is a forward-type converter. The present invention, however, may also be carried out in the form of converters other than the forward converter, such as a fly-back-type converter. In addition, although an isolated converter is used in each of the described embodiments, the invention also may be carried out in the form of a non-isolated converter such as a step-down converter. It is also to be understood that the present invention can be incorporated in a multi-output converter, although a single-output converter has been described in the foregoing illustration of the embodiments. Obviously, the structures of the rectifying/smoothing circuit 40, output voltage detecting circuit 41 and the control circuit 42 described in the foregoing are not exclusive.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A DC-DC converter having a switching element and a synchronous rectifier, the switching element undergoing a switching operation, the converter performing a voltage conversion of an input voltage to provide a converted output voltage at an output/input conversion ratio that is determined by the switching operation of said switching element, the converter delivering the converted output voltage to a load, said DC-DC converter further comprising: a reverse current detector for detecting a reverse current which flows from an output of the converter to an input of the converter, and a reverse current suppressor, the reverse current suppressor controlling the switching operation of said switching element so as to increase the output/input conversion ratio when a reverse current is detected by the reverse current detector, thereby suppressing the reverse current.

2. The DC-DC converter of claim 1, wherein said switching element is arranged so that the switching operation is controlled based on a control voltage applied to a control terminal of said switching element, and wherein said reverse current detector includes a control voltage detector detecting the control voltage of said switching element, an inter-terminal voltage detector for detecting a voltage across said switching element as measured between a current input terminal and a current output terminal of said switching element, and a reverse current detection signal outputting circuit for outputting a reverse current detection signal when said control voltage is below a threshold voltage for turning said switching element on while said inter-terminal voltage across said switching element is at a low level caused by a reverse current.

3. The DC-DC converter of claim 1, wherein said reverse current detector detects at least one of an input current and current flowing through said switching element, and determines that a reverse current is flowing on condition that a detected voltage is not higher than a predetermined set voltage.

4. The DC-DC converter of claim 1, wherein said reverse current detector detects a current which flows in a current path and the direction of which current is reversed when a reverse current exists, and determines that a reverse current exists based on the direction of said current in said current path.

5. The DC-DC converter of claim 1, further comprising an output voltage detecting circuit having an output coupled to a control circuit, the control circuit having an output coupled to a control terminal of said switching element for controlling the ON-OFF operation of the switching element, and further wherein the reverse current suppressor has an output coupled to said control circuit whereby, when a reverse current exists, the switching element is controlled to increase the output/input conversion ratio and thereby increase the converted output voltage of the converter and thus suppress the reverse current.

6. The DC-DC converter of claim 5, whereby an ON period of the switching element is increased to increase the output/input conversion ratio.

7. The DC-DC converter of claim 1, further comprising an isolation transformer having a primary and a secondary, the switching element being coupled in series with the primary in a primary circuit and the reverse current detector having at least one input coupled to the primary circuit.

8. The DC-DC converter of claim 1, further comprising an isolation transformer having a primary and a secondary, the switching element being coupled in series with the primary in a primary circuit, the reverse current detector having at least one input coupled into a secondary circuit of the transformer.

9. The DC-DC converter of claim 1, wherein the converter has an output voltage/output current relationship such that for forward current, the relationship is such that output voltage slightly decreases, with increasing forward current, and for reverse current, the relationship is such that output voltage increases sharply with increasing reverse current.

* * * * *